(12) United States Patent
Klingler

(10) Patent No.: US 6,447,061 B1
(45) Date of Patent: *Sep. 10, 2002

(54) ADJUSTMENT APPARATUS FOR A RESILIENTLY FLEXIBLE SUPPORT ELEMENT OF A BACK REST

(75) Inventor: Knud Klingler, Nürnberg (DE)

(73) Assignee: Schukra-Geratebau GesmbH, Linz (AT)

( * ) Notice: Subject to any disclaimer, the term of this patent is extended or adjusted under 35 U.S.C. 154(b) by 0 days.

This patent is subject to a terminal disclaimer.

(21) Appl. No.: 09/300,061

(22) Filed: Apr. 27, 1999

Related U.S. Application Data

(63) Continuation of application No. 08/564,342, filed on Dec. 12, 1995, now Pat. No. 5,913,569.

(30) Foreign Application Priority Data

Jun. 17, 1993 (DE) .......................................... 432 01 05

(51) Int. Cl.⁷ .............................................. A47C 3/075
(52) U.S. Cl. ................................ 297/284.4; 297/284.1; 74/501.512

(58) Field of Search ........................... 297/284.1, 284.4, 297/452.31, 452.3; 74/501.5 R, 506.2

(56) References Cited

U.S. PATENT DOCUMENTS

| 4,452,485 A | * | 6/1984 | Schuster .............. 297/284.4 X |
| 5,080,434 A | * | 1/1992 | Locher .............. 74/501.5 R X |
| 5,174,526 A | * | 12/1992 | Kanigowski ......... 297/284.4 X |
| 5,217,278 A | * | 6/1993 | Harrison et al. ..... 297/284.4 X |

* cited by examiner

Primary Examiner—Anthony D. Barfield
(74) Attorney, Agent, or Firm—Howard & Howard

(57) ABSTRACT

An apparatus for adjusting the arching of a resiliently flexible support element (4) for supporting the pelvic and/or lumbular vertebrae in a back rest of a seat including an arching mechanism comprising a spring and an operating mechanism. According to the invention the spring (20, 35; 21, 38) is included in the force transmission tract for adjusting the arching.

Figure 3B:
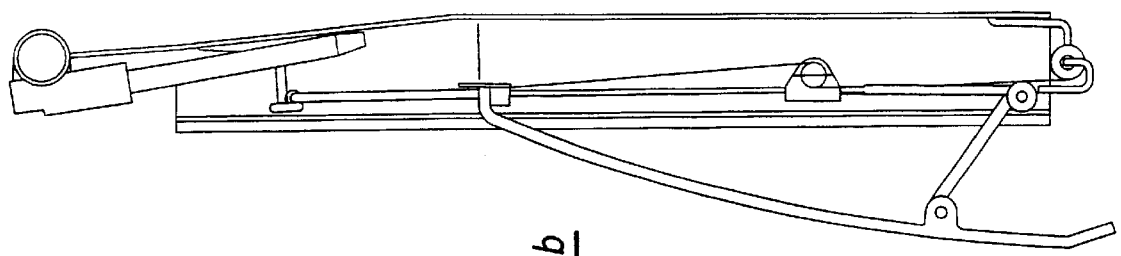

Preferably a spring (20, 35) is fitted between one end of the support element (4) and the force transmission member of the arching mechanism and/or a spring (21, 38) is fitted to the free end of the force transmission member of the arching mechanism behind the operating mechanism.

2 Claims, 4 Drawing Sheets

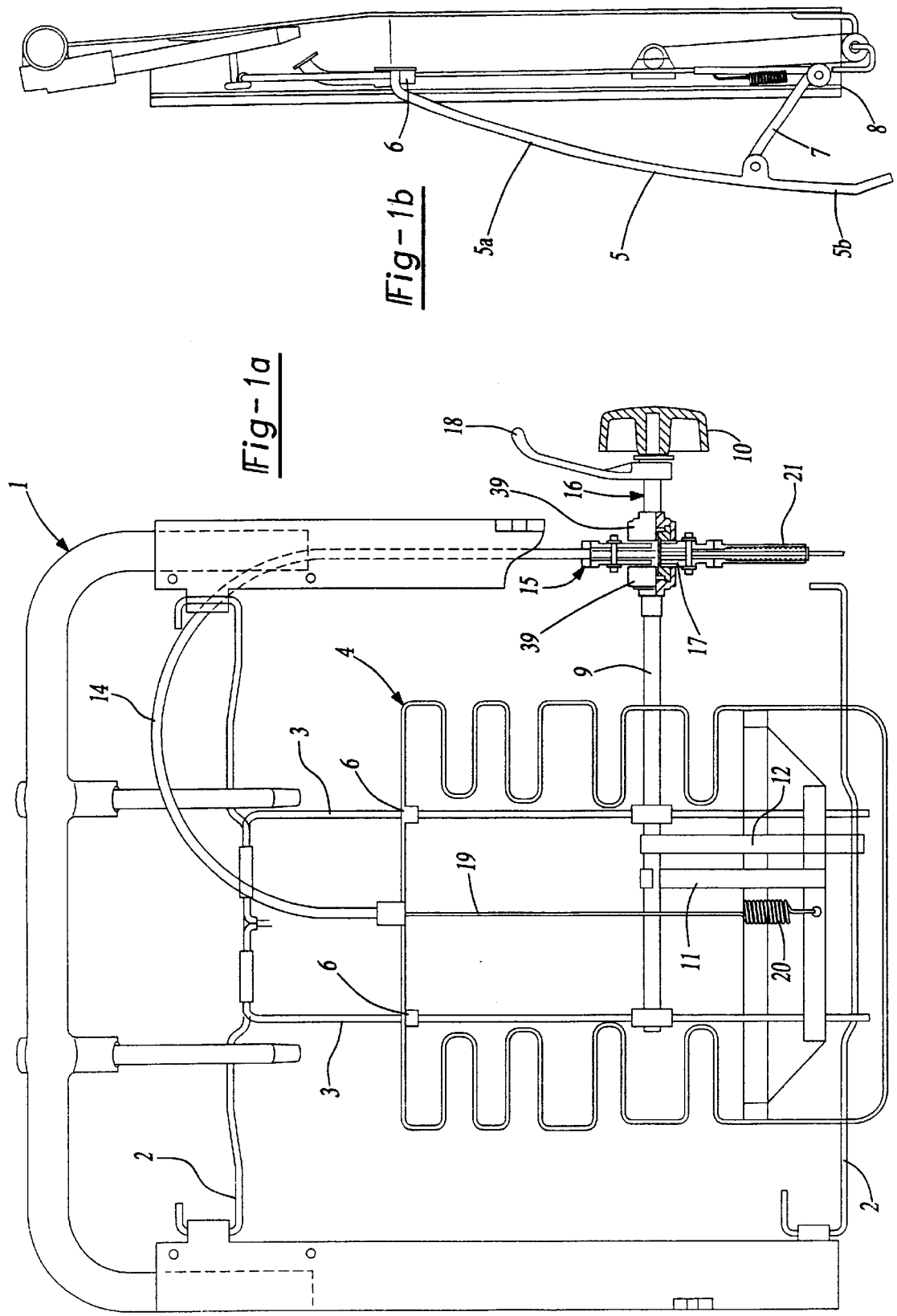

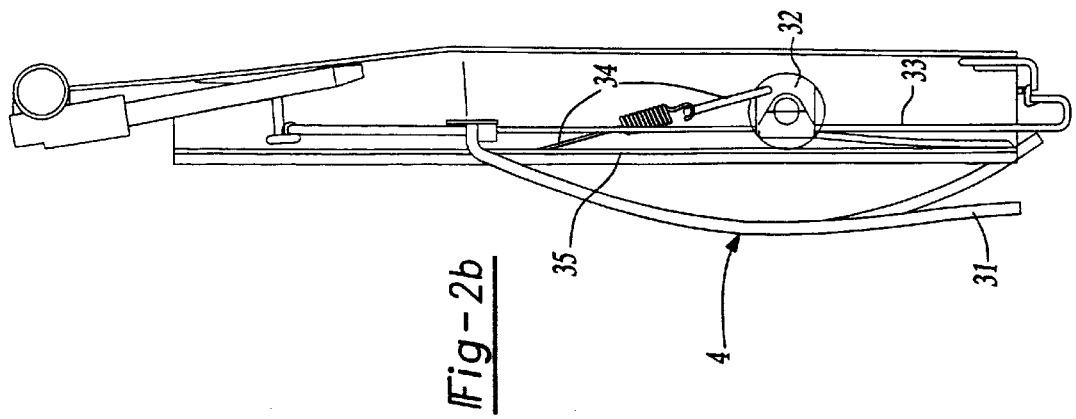
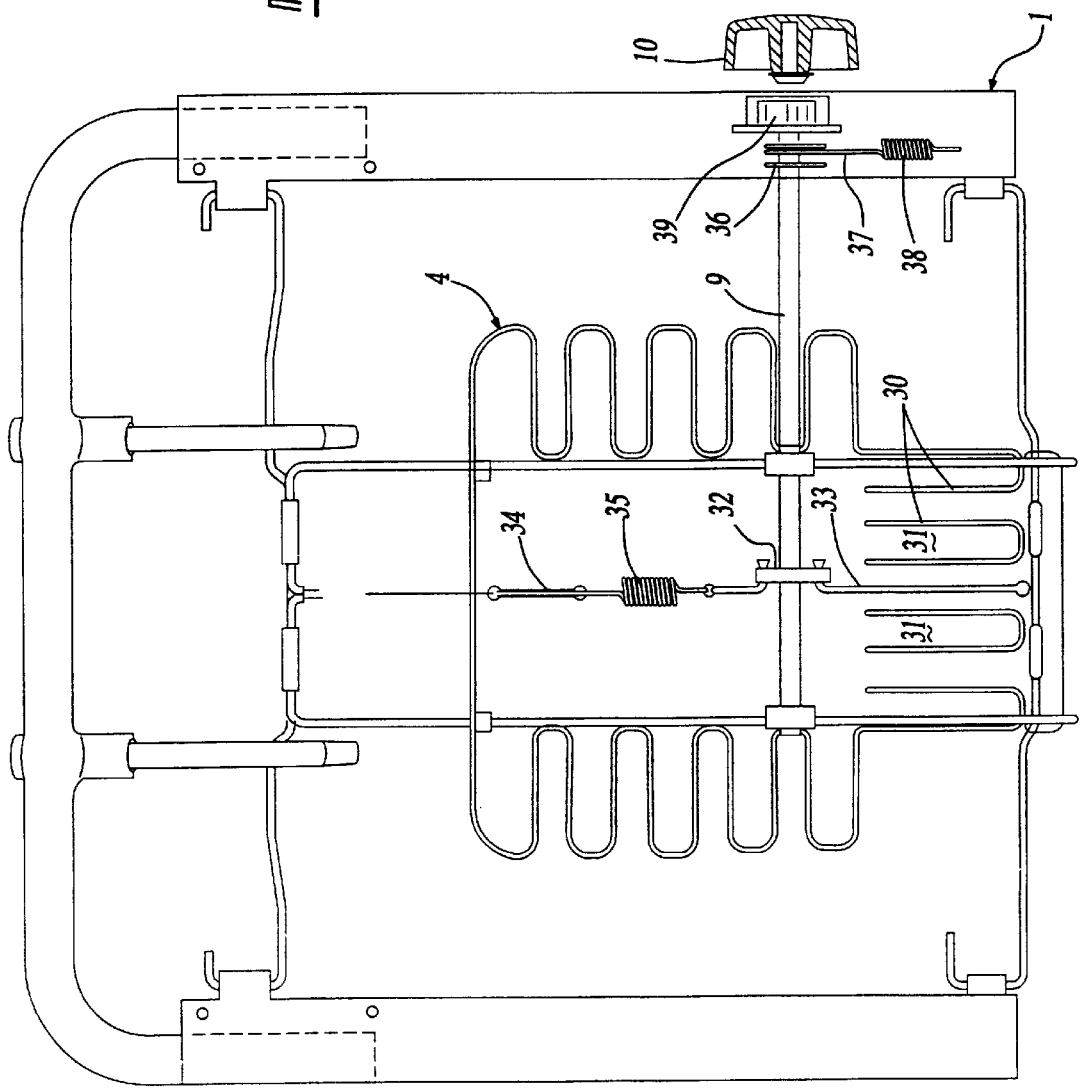

ADJUSTMENT APPARATUS FOR A RESILIENTLY FLEXIBLE SUPPORT ELEMENT OF A BACK REST

This is a continuation of U.S. Ser. No. 08/564,342 filed on Dec. 12, 1995 now U.S. Pat. No. 5,913,569 which is a 371 of PCT/EP94/01963 filed Jun. 16, 1999.

Such an adjustment means is known from U.S. Pat. No. 4,880,271. In that case the support element consists of two parallel longitudinal strips firmly interconnected by means of a plurality of transverse strips. Centrally to the longitudinal strips a further sheet metal strip is fixed at its upper end to the uppermost extreme transverse strip of the support element and is also connected to the cams of an excenter device provided at the lower end of the support element, but not to the subsequent transverse strips. The excenter and thus also the cam is adjustable by way of a worm gear by an operating means comprising a handle, in such a manner that the central sheet metal strip, depending on the direction of rotation, brings about an arching or a flattening (detensioning), as the case may be, of the support element such that the adjustment of the desired degree of arching can be brought about. To the rear of the support element at the upper and lower ends thereof a spring is linked up which draws the two ends of the slightly pre-arched support element towards one another, whereby the adjustment in the sense of an increased arching is supported and thereby facilitated. In this context the spring acts permanently onto the support element—even if no adjustment takes place— and is accordingly independent of the operating means.

In addition, the entire mechanism of the arching means is extremely complicated. Furthermore, which ever degree of arching is set up this is stiff and unyielding, whereby comfort is adversely affected.

It is an object of the invention to so improve an apparatus of the type referred to in the introduction that inspite of simple construction an easy adjustment of the arching is possible and/or that the tensioning force of any particular set up degree of arching can be adjusted more flexibly, the arched region being moreover able to yield.

As shown by the preferred embodiment adjustment force can be varied by the spring and a certain resiliency of the support element is ensured, i.e., it is not rigid and is able to yield to relatively strong forces whereby the comfort level is increased.

The adjustment forces for arching the support element can be compensated for, virtually completely even, by the optional selection of the spring force, so that the adjustment of the degree of arching can proceed virtually without force application.

Further advantageous embodiments of the invention will be apparent from the further subsidiary claims.

Figure 3A:
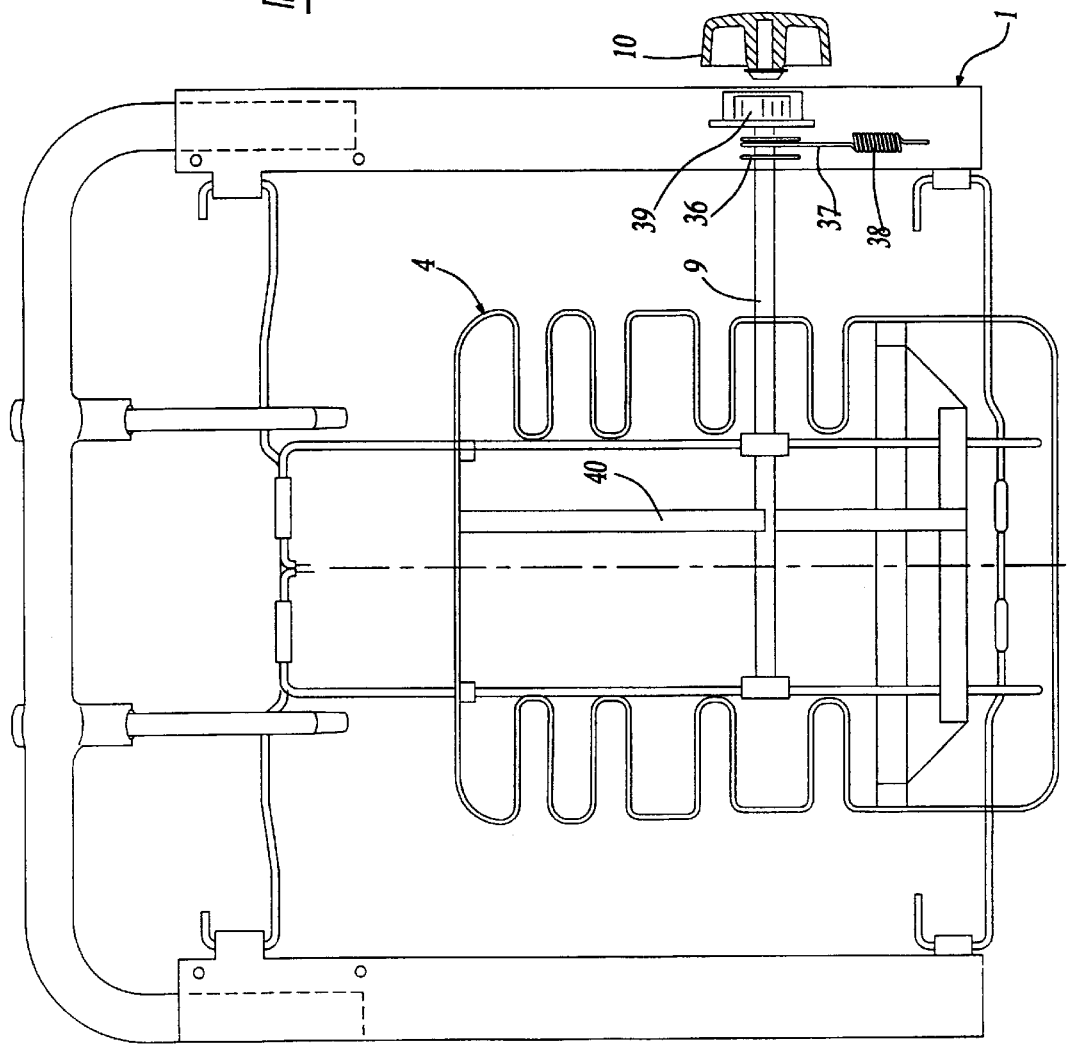
Figure 4:
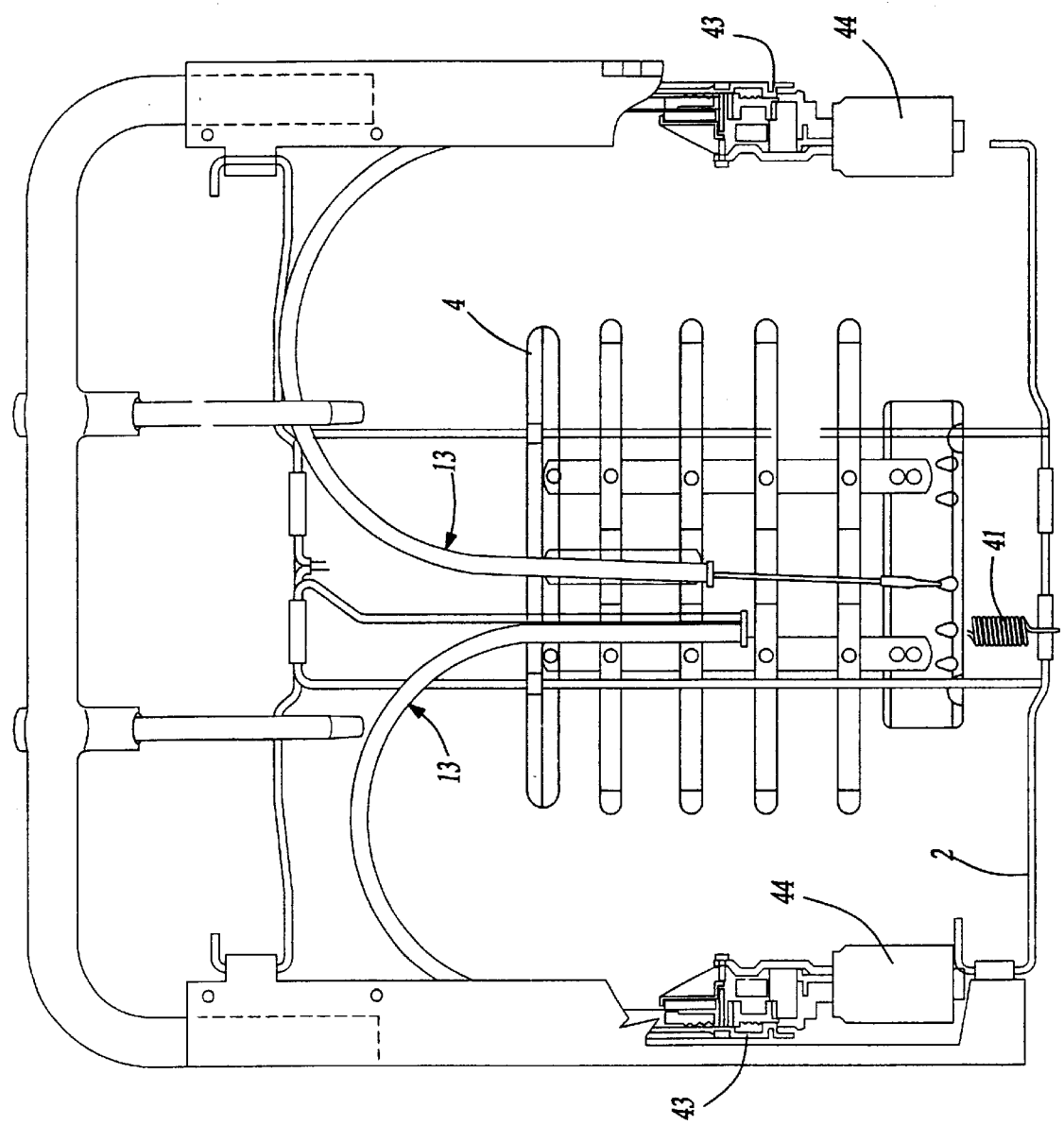

In what follows, the invention will be further explained by way of working examples with reference to schematic drawings. There is shown in:

FIGS. 1a, b a back rest comprising a Bowden cable arrangement for adjusting the arching of a support element in plan view and in side elevation, FIGS. 2a, b a back rest including an excenter arrangement for adjusting the arching of a support element in plan view and in side elevation, FIGS. 3a, b a back rest including traction straps for adjusting the arching in plan view and in side elevation, FIG. 4 a back rest including Bowden cable arrangements and motors for adjusting the arching and the level of the support element in plan view.

The back rest illustrated in FIGS. 1 to 4 comprises a frame 1 in which between two transverse struts 2 a guide is fitted composed of two rods 3 parallel to one another for a resiliently flexible support element 4 which is fitted movably up and down thereon.

The support element 4 in the worldling example according to FIG. 1 comprises a slightly arched panel 5 in one piece the upper end of which is connected to sliding elements 16 fitted on the rods 3. The panel 5 comprises an upper panel portion 5a for supporting the lumbular vertebrae and a lower portion 5b for supporting the pelvis and the pelvic vertebrae. Between the portions 5a and 5b a linkage member 7 is linked to the rear of the panel 5 and has a free end which is linked to a guide 8 provided on the rods 3.

The back rest comprises an apparatus for adjusting the arching as well as a means for level adjustment of the support element 4.

The apparatus for level adjustment comprises an axle 9 mounted on either or both sides in the side limbs of the frame 1, which axle if mounted on one side may in addition be mounted on either or both of the rods 3. The axle 9 passes on one side out of the frame 1 and is connected at its free end to a hand wheel 10 of an operating mechanism. Within the interspace between the rods 3, parallel to one another and to the rods 3, two strips 11, 12 are provided, the first strap 11 at one end being fitted to the axle 9 and at its other end to the lower ends of the support element 4. The second strap 12 is passed around the lower transverse strut 2 of the frame 1 and at one end is fitted to the lower end of the support element 4 and at the other end to the axle 9. In the position shown in FIG. 1a the first strap 11 has been wound virtually completely off the axle 9, whereas in this position the second strap 12 has been wound by way of several windings onto the axle 9. The straps 11, 12 are so fixed to the axle or so wound thereon that as the axle 9 is turned by means of the hand wheel 10 the one strap 11, 12 is wound up and the other strap 12, 11 is unwound so that the entire support element 4 can be moved up and down on the rods 3.

The apparatus for adjusting the arching of the support element 4 according to FIG. 1 comprises a Bowden cable arrangement 13. The sheath 14 of the Bowden cable arrangement 13 is at one end fitted centrally to the upper end of the support element 4 and at the other end to a fitting 15 of an operating means 16 fixed coaxially to the axle 9 to the frame 1. In the fitting 15 a disc-shaped drum 17 is fitted rotatably which by means of a bush on the axis 9 is coupled to a lever 18 outside of the frame 1. The sheathed cable 19 of the Bowden cable arrangement 13 is fixed at one end to the lower end of the linkage 7 by means of an intermediate helical spring 20. The other end of the sheathed cable 19 extending from the sheath 14 is passed around the revolvable drum 17 its free end being so connected to a second helical spring 21 that the end of the sheathed cable is subjected to tensile force.

Preferably the sheathed cable 19 passes around the drum 17 in a non-slipping manner, for which purpose the drum comprises at least one rebate for accommodating at least one projection (not illustrated) firmly fitted on the sheathed cable 19. Preferably the limit of movement of the sheathed cable 19 are also limited between a zero position and the maximum desired degree of arching which can be brought about in optional manner, e.g. by two stop members which may for example coact with the drum 17 or the lever 18 to limit its range of movement (not illustrated). By virtue of the stop members or the limited defined range of movement overloading or even possible destruction due to an uncontrolled application of forces during adjustment can be obviated.

In the illustration according to FIG. 1a the end of the sheathed cable 19 which has been passed around the drum 17 is held under tension by a compressive helical spring 21 supported from the fixture 15. However, it is equally possible to provide a tensile spring fixed to the frame 1.

In the embodiment illustrated in FIG. 2 only an apparatus for adjusting the arching is illustrated. In this case the support element 4 is composed of a single panel having a plurality of lateral cuts provided in its lower region which in the lower region outline projections 31. In the event of arching of the support element 4 these projections 31 emerge from the plane of the support element as apparent from FIG. 2b and serve as a support for the pelvic vertebrae.

In this working example likewise an axle 9 is provided which in the region between the rods 3 carries a disc 32 which is rigidly connected to the axle 9. In this working example the support element 4 at it lower end is linked to the lower transverse struts 2. To each of the lower edge and the upper edge of the support element a traction rod 33 and/or 34 respectively is hooked, these being hung from diametrically opposite localities at the edge of the disc 32. In one of the traction tension rods 33 or 34 in this case the upper traction rod 34 a spring 35 is inserted.

In the region of the frame 1 a second disc 36 is provided on the axle 9 on which an end of a cable 36 is fitted adapted to be wound up or unwound and the free end of which is fitted to the frame 1 by way of a tensile spring 38.

In the embodiment illustrated in FIG. 3 the support element 4 is designed as explained in the description of FIG. 1. In FIG. 3 as well only one apparatus for adjusting the arching is illustrated. The embodiment according to FIG. 3 is of the same design as that described in the working example of FIG. 2 except that, instead of an excenter arrangement comprising the disc 32 and the traction rods 33, 34, in this case the upper and lower ends of the support elements 4 are interconnected by a strap 40 which passes in a freely movable manner through the axle 9 or alternatively may be connected thereto.

In the working example illustrated in FIG. 4—in which the springs according to the invention for greater clarity have been omitted—there is provided a Bowden cable arrangement 13 which serves both for level as well as for arching adjustment of the support element 4, there being provided between the lower end of the support element 4, in this case taking the form of a metal grid, and the lower transverse strut 2 a restoring spring 41 which draws the support element 4 towards the lower transverse strut 2. The apparatus for adjusting arching is constructed as described with reference to FIG. 1 except that the sheath 14 of the Bowden cable arrangement 13 is not fixed to the upper end of the support element 4 but to the free end of an extension 42 which is there fitted and that instead of a manual adjustment a gear mechanism 43 with an electric motor 44 is provided. Likewise a gear mechanism 43 with an electric motor 44 is provided for level adjustment. Preferably at least all apparatus with manual adjustment are equipped with a free wheel brake 39 (FIGS. 1 to 3) which prevent an inadvertent readjusting of the arching and/or level setting, without, however, inhibiting a voluntary adjustment by means of the hand wheel 10 or the lever 18. Preferably the support element 4 according to FIGS. 1 to 3 is made of plastics which offers the advantage of a simple and inexpensive manufacture combined with low weight even if optionally reinforcements such as ribs or regions of larger cross-section are provided, since these can easily be manufactured in casting procedures or by deforming. Preferably the support elements 4 according to FIGS. 1 and 3 are composed of two parts, the support element 4 proper and the linkage member 7, in such a manner that they can be assembled without tools, e.g. by insertion of axle stubs into bearings—which permit a predetermined rotation. In the case of the support element 4 according to FIG. 2 these may also be punched out of a plastics sheet.

The various embodiments as described with reference to FIGS. 1 to 4 may also be employed in optional suitable combinations.

The apparatus for adjusting arching according to FIG. 1 operates as follows:

By releasing the lever 18 from its locked position, where the locking device may be of an optional known type, for example a free wheel brake 39, the drum 17 is turned by a pivotal movement of the lever 18 about the axle 9 causing the latter, depending on the direction of rotation, to wind up or unwind the sheathed cable 19 of the Bowden cable arrangement 13. Due to the tensile force of the spring 21 the rotary movement for arching the support element 4 is supported such that as a result the force required for arching is reduced and arching is facilitated. When making an adjustment with a view to reducing the degree of arching the resiliently flexible support element 4 is detensioned and accordingly thereby counteracts the tensile force of the spring 21 so that in that situation as well an easy adjustment is provided. Due to the spring 20 inserted between the end of the sheathed cable 19 and the suspension point in the lower region of the support element 4 or the linkage member 7 the particular degree of arching which has been set up is no longer rigid as in known constructions but due to the spring 20 the support element can yield resiliently to major pressure and the entire back rest is thereby supplied with softer and more comfortable characteristics. If the increased pressure is reduced, the spring 20 contracts again and the previously set up arching is restored.

The apparatus illustrated in FIG. 2 for adjusting the arching operates similar to that described with reference to FIG. 1, in this case a rotary movement of the axle 9 being brought about by the hand wheel 10 after the latter has been released from its locked position to bring about a movement of the adjoining ends of the traction rods 33 or 34 in the disc 32 away from or towards one another in respect of their levels whereby the arching or detensioning respectively of the support element 4 takes place. In this working embodiment the spring 38 which is coupled to the cable 37 and the second disc 36 is so employed that it supports the force which has to be exercised onto the hand wheel 10 in order to arch the support element 4, i.e. so that the force required for adjusting the degree of arching is likewise reduced.

The working example illustrated in FIG. 3 operates analogously to that illustrated in FIG. 2, the belt 40 in this case, on rotation of the axle 9, being wound onto the axle 9 in order to achieve arching, here as well due to the spring 38 which is provided the application of force being reduced by the spring action.

Due to the support or compensation of the forces counteracting the arching adjustment effected by the springs 21 or 28 as the case may be the force to be exerted in order to adjust the degree of arching is substantially reduced so that even low powered and therefore small and low noise electric motors can be employed without difficulty, so that the adjustments can also be performed with the aid of motor-driven transmissions. In FIG. 4 electric motors 44 with gear mechanisms 43 are provided both for adjusting the level as well as the degree of arching. The function of these embodiments is analogous to that described with reference to FIG. 1 except that instead of the rotary movement by means of a hand wheel 10 or the lever 18 this takes place by virtue of the electric reversible motors 44. It is advantageous in all embodiments to limit the respective movements, e.g. by stop formations in order to avoid excessive tensions on the support element 4 which might eventually result in damage or even destruction.

What is claimed is:

1. A lumbar support mechanism comprising:
   a flexible support member having oppositely disposed upper and lower ends;
   a spring having a first end and a second end with the first end connected to the lower end of the flexible support member; and
   a cable assembly having a sleeve and a cable slidably disposed therein, the sleeve having a first end coupled to the flexible support member, and the sleeve first end being more adjacent to the spring second end than the spring first end, and the cable having a first end coupled to one of the upper end and the lower end of the flexible support member wherein displacement of the cable relative to the sleeve in a first direction causes the flexible support member to bow and displacement of the cable relative to the sleeve in a second direction allows the flexible support member to straighten and further wherein the spring deflects responsive to a force against the flexible support member when the flexible support member is in a deflected condition, causing relative displacement between the upper end and the lower end of the flexible support member.

2. A lumbar support mechanism, as set forth in claim 1, wherein the first end of the cable is coupled to the flexible support via the spring.

* * * * *